(12) United States Patent
Ohishi et al.

(10) Patent No.: US 8,107,112 B2
(45) Date of Patent: Jan. 31, 2012

(54) IMAGE FORMING APPARATUS AND SCANNED DATA PROCESS METHOD

(75) Inventors: Tsutomu Ohishi, Fukuoka (JP); Katsuhiko Nakagawa, Fukuoka (JP); Yuuko Sugiura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 68 days.

(21) Appl. No.: 12/636,396

(22) Filed: Dec. 11, 2009

(65) Prior Publication Data

US 2010/0091338 A1 Apr. 15, 2010

Related U.S. Application Data

(63) Continuation of application No. 10/660,535, filed on Sep. 12, 2003, now Pat. No. 7,633,639.

(30) Foreign Application Priority Data

Sep. 13, 2002 (JP) ................................. 2002-269284
Sep. 10, 2003 (JP) ................................. 2003-318478

(51) Int. Cl.
*G06F 3/12* (2006.01)
*G06K 15/00* (2006.01)

(52) U.S. Cl. ...................... 358/1.15; 358/1.13; 358/1.11; 358/1.18

(58) Field of Classification Search ................ 358/1.15, 358/1.16, 1.17, 1.18, 1.14, 1.13, 1.11, 1.9, 358/1.1, 1.6, 444, 402, 403, 405, 404, 448, 358/474, 1.2, 400, 401, 407, 468, 500, 501; 347/2, 3, 5, 14, 23; 399/1, 8, 9, 10, 11, 38, 399/84; 709/201, 203, 208, 217, 219, 223; 382/312, 317, 321; 715/234, 239
See application file for complete search history.

(56) References Cited

U.S. PATENT DOCUMENTS

| | | | |
|---|---|---|---|
| 5,615,015 A * | 3/1997 | Krist et al. | .................... 358/296 |
| 5,881,168 A | 3/1999 | Takaoka et al. | |
| 5,999,766 A | 12/1999 | Hisatomi et al. | |
| 6,069,706 A | 5/2000 | Kajita et al. | |
| 6,192,165 B1 | 2/2001 | Irons | |
| 7,280,238 B2 | 10/2007 | Akiyoshi | |
| 2001/0011283 A1 | 8/2001 | Kato et al. | |
| 2002/0033964 A1 | 3/2002 | Suzuki et al. | |
| 2002/0054336 A1 | 5/2002 | Yamaguchi | |
| 2002/0122203 A1 | 9/2002 | Matsuda | |
| 2003/0072023 A1 | 4/2003 | Tanaka | |
| 2003/0133136 A1 | 7/2003 | Ohishi et al. | |
| 2003/0140174 A1 | 7/2003 | Ohishi et al. | |
| 2003/0218765 A1 | 11/2003 | Ohishi et al. | |
| 2004/0021890 A1 | 2/2004 | Hirai et al. | |
| 2004/0057067 A1 | 3/2004 | Ohishi et al. | |
| 2004/0057074 A1 | 3/2004 | Ohishi et al. | |
| 2004/0075857 A1 | 4/2004 | Akiyoshi et al. | |
| 2004/0218208 A1 | 11/2004 | Akiyoshi et al. | |
| 2008/0068649 A1 * | 3/2008 | Emori | .......................... 358/1.15 |

FOREIGN PATENT DOCUMENTS

EP 0 863 662 A2 6/1998

(Continued)

OTHER PUBLICATIONS

Submissions by the Opponent issued Jan. 17, 2011, in Patent Application No. EP 03 255 722.5.

*Primary Examiner* — Dov Popovici

(74) *Attorney, Agent, or Firm* — Oblon, Spivak, McClelland, Maier & Neustadt, L.L.P.

(57) ABSTRACT

An image forming apparatus including a scanner engine and an operation panel is provided, in which the image forming apparatus includes: a display part for displaying a selection screen for selecting a transfer destination of scanned data from among a plurality of transfer destinations on the operation panel; a scanning process part for causing the scanner engine to scan a document to produce scanned data; and a transfer part for transferring the scanned data to one or more selected transfer destinations.

12 Claims, 15 Drawing Sheets

FOREIGN PATENT DOCUMENTS

| | | |
|---|---|---|
| JP | 8-289067 | 11/1996 |
| JP | 10-308835 | 11/1998 |
| JP | 11-146115 | 5/1999 |
| JP | 2000-295406 | 10/2000 |
| JP | 2000-316082 | 11/2000 |
| JP | 2000-354126 | 12/2000 |
| JP | 2001-028655 | 1/2001 |
| JP | 2001-167024 | 6/2001 |
| JP | 2001-306819 | 11/2001 |
| JP | 2001-326804 | 11/2001 |
| JP | 2001-350774 | 12/2001 |
| JP | 2002-77177 | 3/2002 |
| JP | 2002-082806 | 3/2002 |
| JP | 2002-222081 | 8/2002 |

\* cited by examiner

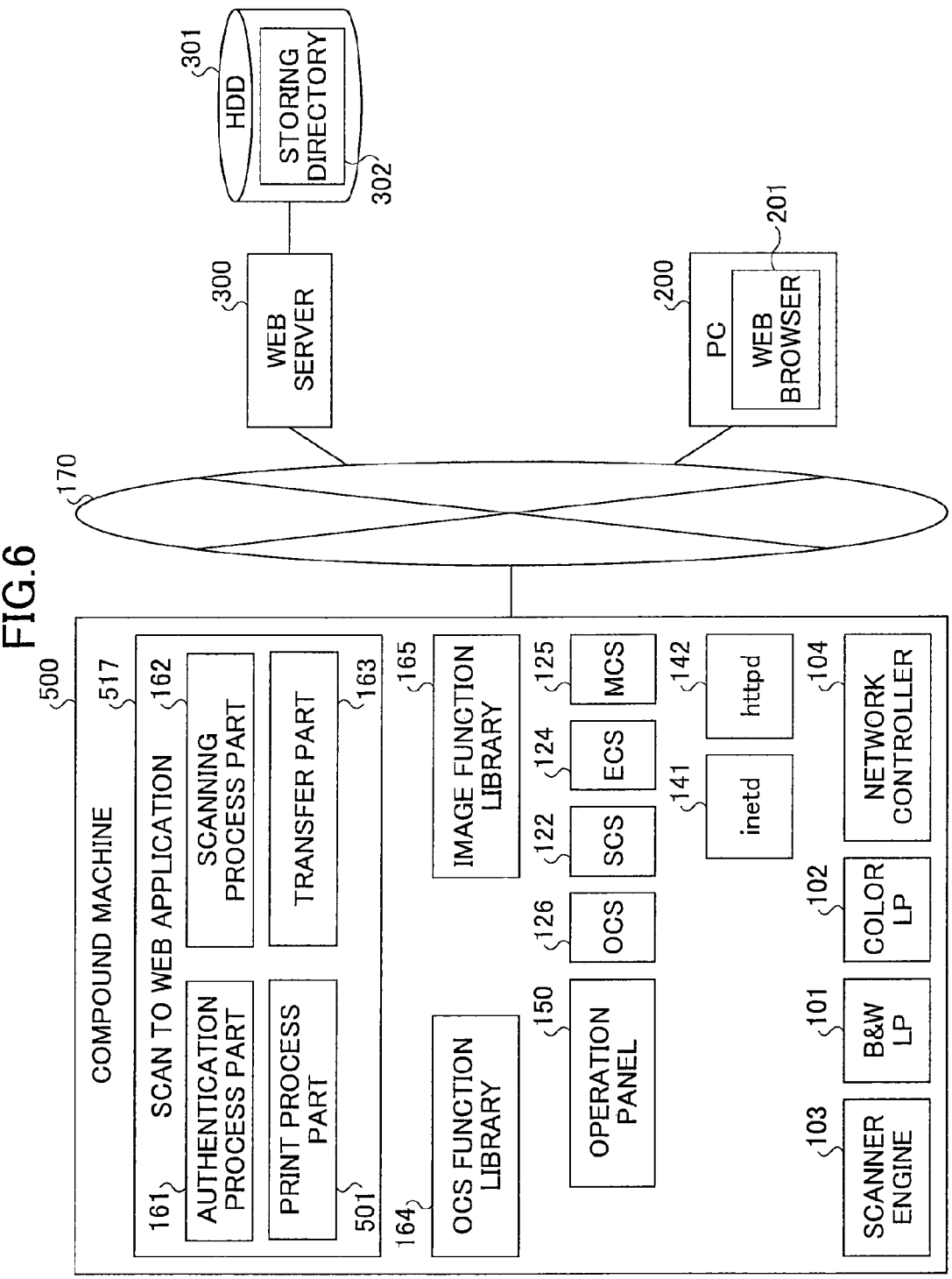

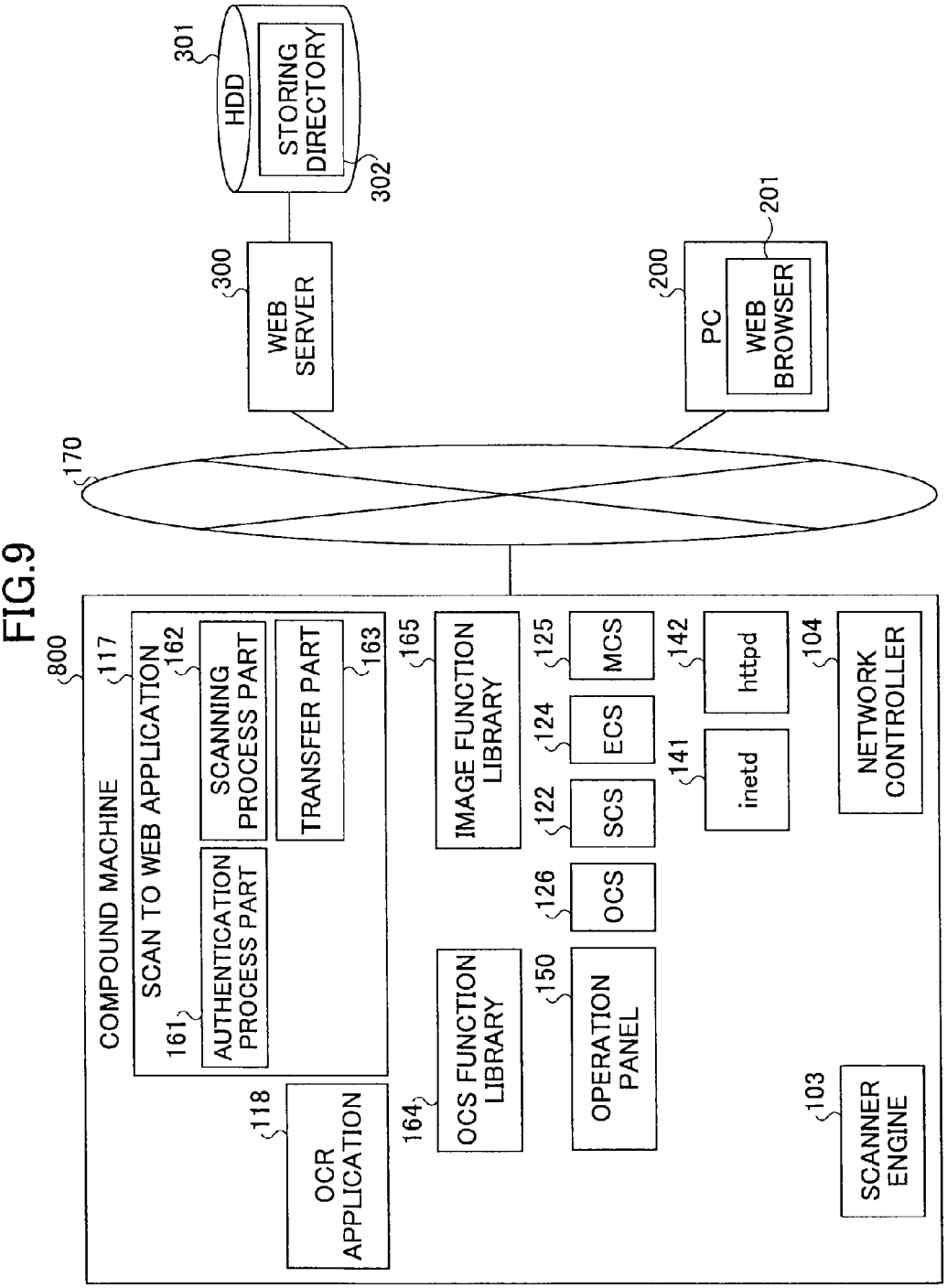

FIG.13

| SCAN TO FILE | ftp:/ftp.xxx.co.jp        ~(FOR FTP)<br>file://tmp/scanFile/  ~(FOR NETBIOS, NFS) |
|---|---|
| SCAN TO MAIL | name@xxx.xxx |

FIG.14

| TRANSFER DESTINATION | DATA TYPE |
|---|---|
| http://www.xxx.xxx/ | OCR |

ADD TRANSFER DESTINATION ~10

IMAGE FORMING APPARATUS AND SCANNED DATA PROCESS METHOD

CROSS-REFERENCE TO RELATED APPLICATIONS

This application is a continuation and claims the benefit of priority under 35 U.S.C. §120 from U.S. application Ser. No. 10/660,535, filed Sep. 12, 2003 now U.S. Pat. No. 7,633,639, the entire content of which is incorporated herein by reference. U.S. application Ser. No. 10/660,535 claims the benefit of priority under 35 U.S.C. §119 of Japanese Patent Application Nos. 2003-318478, filed Sep. 10, 2003, and 2002-269284, filed Sep. 13, 2002.

BACKGROUND OF THE INVENTION

1. Field of the Invention

The present invention relates to an image forming apparatus that provides user services relating to image forming processes such as copying, printing, scanning, facsimile and the like. More particularly, the present invention relates to an image forming apparatus and a scanned data process method for transferring scanned data to a Web server and the like on the Internet.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources include a display part, a printing part and an image pickup part, and are used for image forming processes. The applications perform processes intrinsic for user services of printer, copier and facsimile and the like. The platform includes various control services performing management of hardware resources necessary for at least two applications commonly, performing execution control of the applications, and image forming processes, when a user service is executed.

According to such a compound machine, the scanned data produced by scanning a document by the scanner is immediately printed or stored in a storage such as a hard disk.

However, there is a case in which it is necessary to store scanned data in a computer on a network rather than in the compound machine. That is, since the compound machine is frequently used by many users, failure of the compound machine or failure of a storage in the compound machine may arise. In such a case, the scanned data in the compound machine can not be read out.

In addition, in a case in which many compound machines are connected on the network, if the number of pieces of scanned data managed in each compound machine increases, it is necessary to determine which compound machine stores scanned data to be used. Thus, efficiency for using scanned data is not good.

SUMMARY OF THE INVENTION

An object of the present invention is to provide an image forming apparatus and a scanned data process method for using scanned data efficiently and for improving security of scanned data.

The above object is achieved by an image forming apparatus including a scanner engine and an operation panel, the image forming apparatus including:

a display part for displaying a selection screen for selecting a transfer destination of scanned data from among a plurality of transfer destinations on the operation panel;

a scanning process part for casing the scanner engine to scan a document to produce scanned data;

a transfer part for transferring the scanned data to one or more selected transfer destinations.

According to the present invention, since the scanned data can be transferred to a transfer destination, scanned data can be protected against failure of the image forming apparatus, so that the scanned data can be used efficiently. In addition, storage capacity of the image forming apparatus for the scanned data can be saved.

In image forming apparatus, the one or more selected transfer destinations may include one or more of a storing area on a WEB server on a network, a mail destination, and a shared storing area on a network. According to the present invention, the convenience of the users can be improved.

If authentication information is required for accessing the storing area or the shared storing area, the display part may display a screen for inputting the authentication information when the storing area or the shared storing area is selected.

In the image forming apparatus, the display part may display a screen for selecting a data type of scanned data to be transferred among from a plurality of data types, and the transfer part converts the scanned data into data of the data type, and transfers the data of the data type. Accordingly, the scanned data can be converted into various types of data and can transferred.

The plurality of data types may include a type of recognized data that is obtained by performing character recognition process on the scanned data. When the recognized data is selected as a data type, the transfer part can send the recognized data and the scanned data to a transfer destination. According to the present invention, characters and an image can be stored in a transfer destination.

The compound machine may include a print process part for receiving the scanned data from a storing area of the transfer destination and print the scanned data. According to this configuration, the scanned data can be printed by the image forming apparatus without using the client terminal, so that efficiency for using the scanned data can be improved.

In the image forming apparatus, the print process part may display, on the operation panel, a data selection screen for displaying a list of scanned data stored in the storing area, and print scanned data selected from the list. The user can select desired scanned data according to this configuration.

BRIEF DESCRIPTION OF THE DRAWINGS

Other objects, features and advantages of the present invention will become more apparent from the following detailed description when read in conjunction with the accompanying drawings, in which:

FIG. 6 shows main parts of the compound machine and a network configuration including the compound machine according to the second embodiment;

FIG. 9 shows main parts of the compound machine and a network configuration including the compound machine according to the third embodiment;

FIG. 13 is a figure for explaining formats for specifying storing locations according to the fifth embodiment;

FIG. 14 shows a screen in which it is determined to send OCR data to a specified directory in a WEB server according to the fifth embodiment;

DETAILED DESCRIPTION OF THE PREFERRED EMBODIMENTS

In the following, the image forming apparatus and the scanned data process method will be described with reference to figures.

First Embodiment

Figure 1:
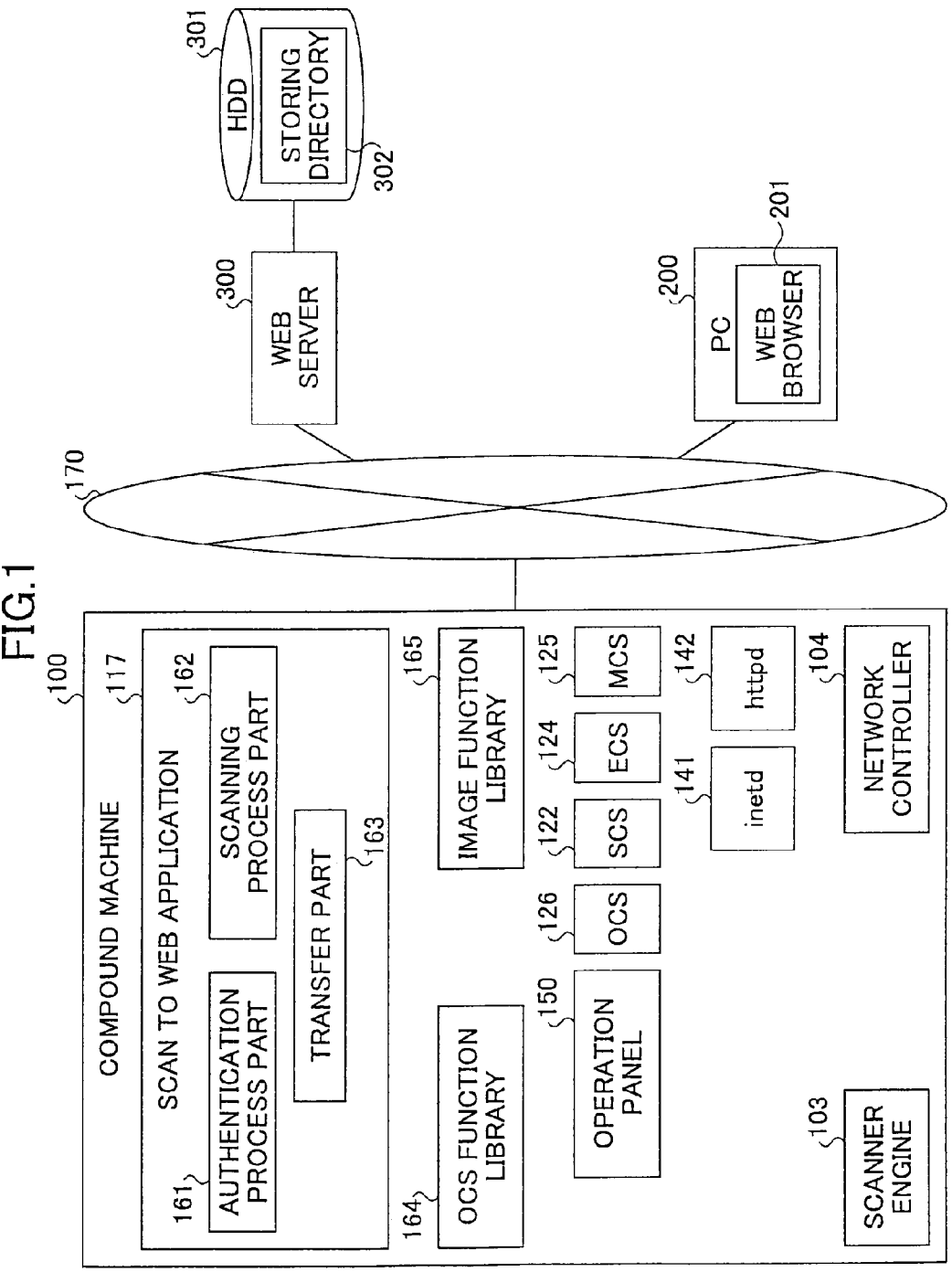
FIG. 1 shows main parts of the compound machine and a network configuration including the compound machine according to the first embodiment of the present invention.

FIG. 1 shows main parts of the image forming apparatus (to be referred to as a compound machine) and a network configuration including the compound machine. The compound machine 100 of the first embodiment generates a scanned data file by performing scanning process by the scanner engine 103. The compound machine 100 transfers the scanned data file to a Web server 300 on the Internet. The Web server 300 stores the scanned data file in a storing directory 302 which is a shared area in the hard disk drive 301. A PC (personal Computer) 200 on the Internet 170 can access the Web server 300 and the PC 200 displays the scanned data file and prints the scanned data file.

As shown in FIG. 1, the compound machine of this embodiment is connected to the Internet 170 to which the Web server 300 and the PC 200 are connected, in which the PC 200 is a client terminal of the Web server 300 and TCP/IP is used as the communication protocol for the compound machine 100, the Web server 300 and the PC 200.

As shown in FIG. 1, main parts for realizing the scanned data processing method in the compound machine 100 includes a SCAN to WEB application 117, an OCS function library 164, an image function library 165, after mentioned control services such as OCS 126, SCS 122, ECS 124 and MCS 125, inetd 141 and httpd 142 that operate as daemon in the general OS, a scanner engine 103, a network controller 104 and an operation panel 150.

The SCAN to WEB application 117 transfers image data of a document obtained by scanning the document to the Web server 300 on the Internet 170. The SCAN to WEB application 117 is a process running on the after mentioned application layer. As shown in FIG. 1, the SCAN to WEB application 117 includes an authentication process part 161, a scanning process part 162, a transfer part 163. The OCS function library 164 and the image function library 165 are dynamically linked to the SCAN to WEB application.

To log on to the Web server 300, the authentication process part 161 displays a login screen on an operation display part of the operation panel 150 and sends a user ID and a password input from the login screen to the Web server 300 as encrypted data. The transmission of the encrypted data is performed by https protocol via the httpd 142 and the network controller 104.

The scanning process part 162 controls execution of scanning of the scanner engine 103 by calling functions for scanning that are registered in the image function library 165. In addition, the scanning process part 162 converts the image data obtained by scanning a document into TIFF format to generate scanned data.

The transfer part 163 transfers the scanned data generated by the scanning process part to the Web server 300 on the Internet 170. The transmission of the scanned data is performed by using the http protocol via the httpd 142 and the network controller 104.

The OCS function library 164 registers drawing functions for output drawings on the operation display part of the operation panel 150. The SCAN to WEB application 117 calls the drawing function so that a necessary screen is displayed on the operation display part of the operation panel 150.

The image function library 165 includes functions for scanning such as a scanning request for the scanner engine 103 and functions for printing. The SCAN to WEB application 117 calls the functions so that scanning process is performed by the scanner engine 103. In addition, by the function call, requests for the ECS 124 and MCS 125 are performed.

The inetd 141 always monitors data send/receive request. When the inetd 141 detects a connection request for a predetermined protocol, the inetd 141 launches a server program corresponding to the protocol. The inetd 141 is similar to the inetd in UNIX. In the compound machine 100 of the first embodiment, the inetd 141 always monitors a port for data send/receive for the http protocol and the https protocol. When the inetd 141 detects a connection request on the port, the inetd 141 launches the httpd 142.

The httpd 142 always monitors port 80 for receiving a message sent by http protocol or https protocol. The httpd 142 receives a request message on the port 80, and sends a response message. The structure of the response message and the request message is the same as that of normal http protocol. Each message includes a message body of html format.

The network controller 104 has capabilities for sending/receiving data by using the http protocol or the https protocol.

The Web server is, for example, a host computer or a work station of an application service provider (ASP). A storing directory is prepared in the hard disk drive (HDD) 301 of the Web server 300 for storing scanned data sent from the compound machine 100. The storing directory 302 is set to be shared by the compound machine 100 and the PC 200, such that the compound machine 100 can write data in the storing directory 302 and the PC 200 can reads the data from the storing directory 302.

The PC 200 is a Web client of the Web server 300 and requests various services from the Web server 300. The PC 200 may be a computer of a user on the Internet 170. In this embodiment, the PC 200 requests the Web server 300 to display scanned data stored in the HDD 301.

Figure 2:
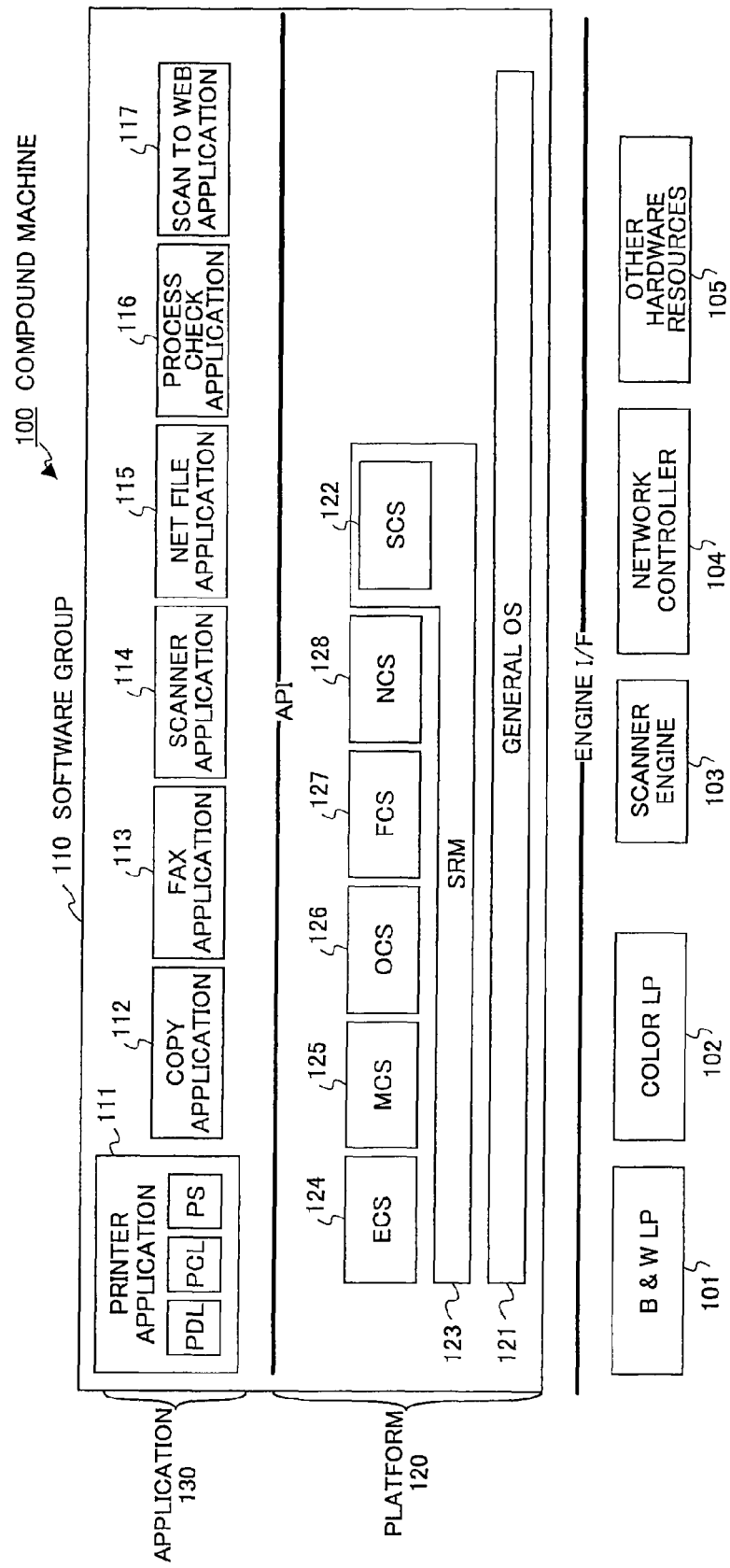
FIG. 2 is a block diagram of the functional configuration of the compound machine of the first embodiment.

Next, the whole functional configuration of the compound machine 100 will be described. FIG. 2 is a block diagram of the compound machine according to the first embodiment of the present invention.

As shown in FIG. 2, the compound machine 100 includes hardware resources and a software group 110. The hardware resources include a black and white line printer (B&W LP) 101, a color laser printer (Color LP) 102, and hardware resources 103 such as a scanner, a facsimile, a hard disk, memory and a network interface. The software group 110 includes a platform 120, applications 130.

The platform 120 includes control services for interpreting a process request from an application and issuing an acquiring request for hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, a network control service (NCS) 128 and a certification control service (CCS) 129. In addition, the platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently as a process.

The process of the SRM 123 is for performing control of the system and for performing management of resources with the SCS 122. The process of the SRM 123 performs arbitration and execution control for requests from the upper layer that uses hardware resources including engines such as the scanner part and the printer part, a memory, a HDD file, a host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt application control.

The process of the ECS 124 controls engines of hardware resources including the white and black laser printer (B&W LP) 101, the color laser printer (Color LP) 102, the scanner, and the facsimile and the like. The process of the MCS 125 obtains and releases an area of the image memory, uses the hard disk apparatus (HDD), and compresses and expands image data.

The process of the FCS 127 provides APIs for sending and receiving of facsimile from each application layer by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network by a protocol to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application or from the control service. The OCS function library is dynamically linked to the application and each module of the control services. All of the OCS 126 can be configured as a process, or can be configured as an OCS library.

The application 130 includes a printer application 111 that is an application for a printer having page description language (PDL) and PCL and post script (PS), a copy application 112, a fax application 113, a scanner application 114 that is an application for a scanner, a network file application 115, a process check application 116 and the above-mentioned SCAN to WEB application 117.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop applications for the compound machine 100, and can executes the application in an application layer on the control service layer in the compound machine 100. The authentication may be one of the applications.

In the compound machine 100 of the first embodiment, although processes of applications 130 and processes of control services operate, the application and the control service can be a single process. In addition, an application in the applications 130 can be added or deleted one by one.

Figure 3:
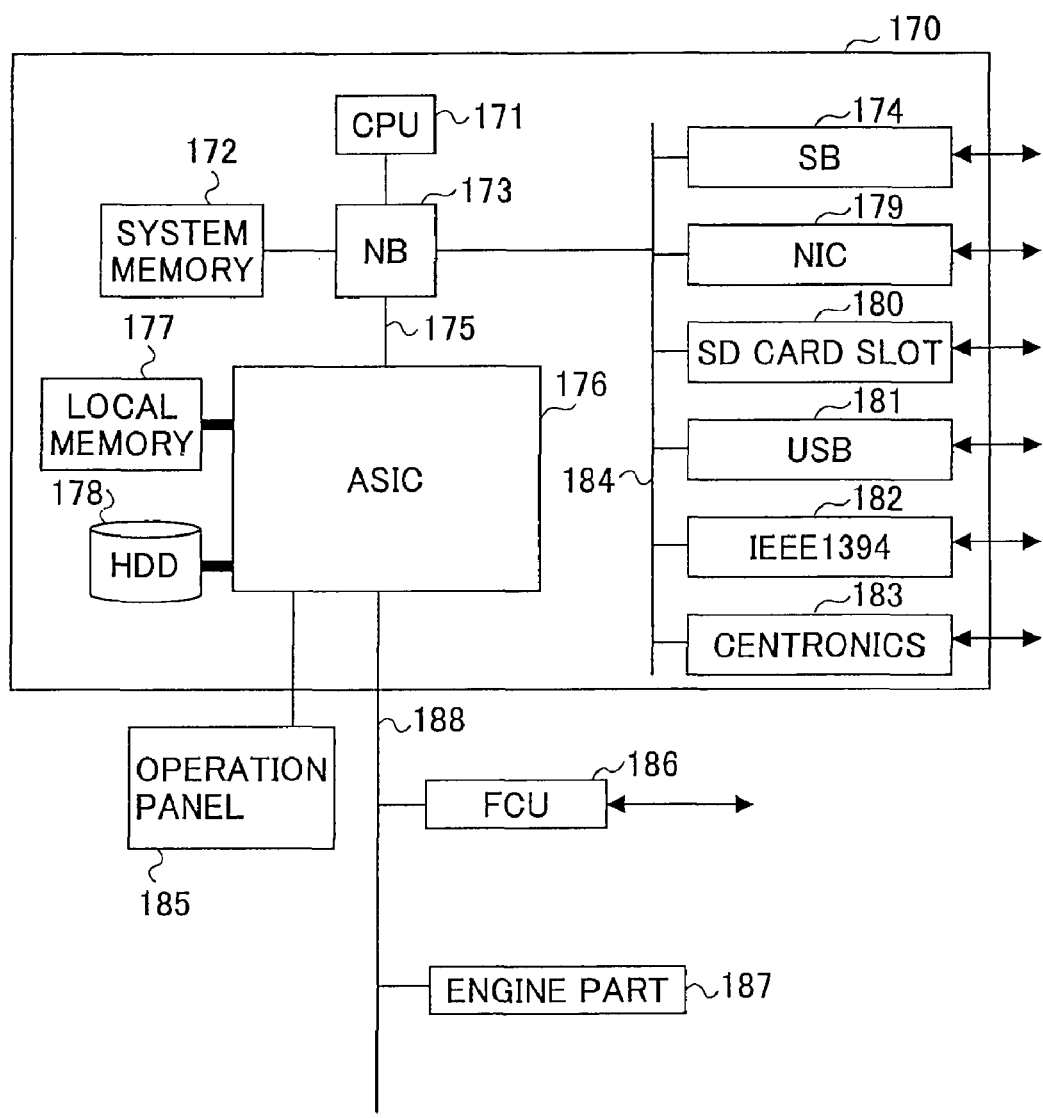
FIG. 3 is a block diagram of the hardware configuration of the compound machine of the first embodiment.

FIG. 3 shows an example of a hardware configuration of the compound machine 100.

The compound machine 100 includes a controller 170, an operation panel 185, a fax control unit (FCU) 186, and an engine part 187 that is hardware resource such as a printer that is specific for image forming processing. The controller 170 includes CPU 171, a system memory 172, a north bridge (NB) 173, a south bridge (SB) 174, ASIC 176, a local memory 177, HDD 178, a network interface card (NIC) 179, a SD card slot 180, a USB device 181, an IEEE1394 device 182, and a Centronics 183. The memories 182, 187 may includes RAMs and/or ROMs, for example. The FCU 186 and the engine part 187 are connected to the ASIC 176 in the controller via a PCI bus 188. The CPU 171 executes programs of the application and control services and the like installed in the compound machine 100 by reading data from a RAM.

Figure 4:
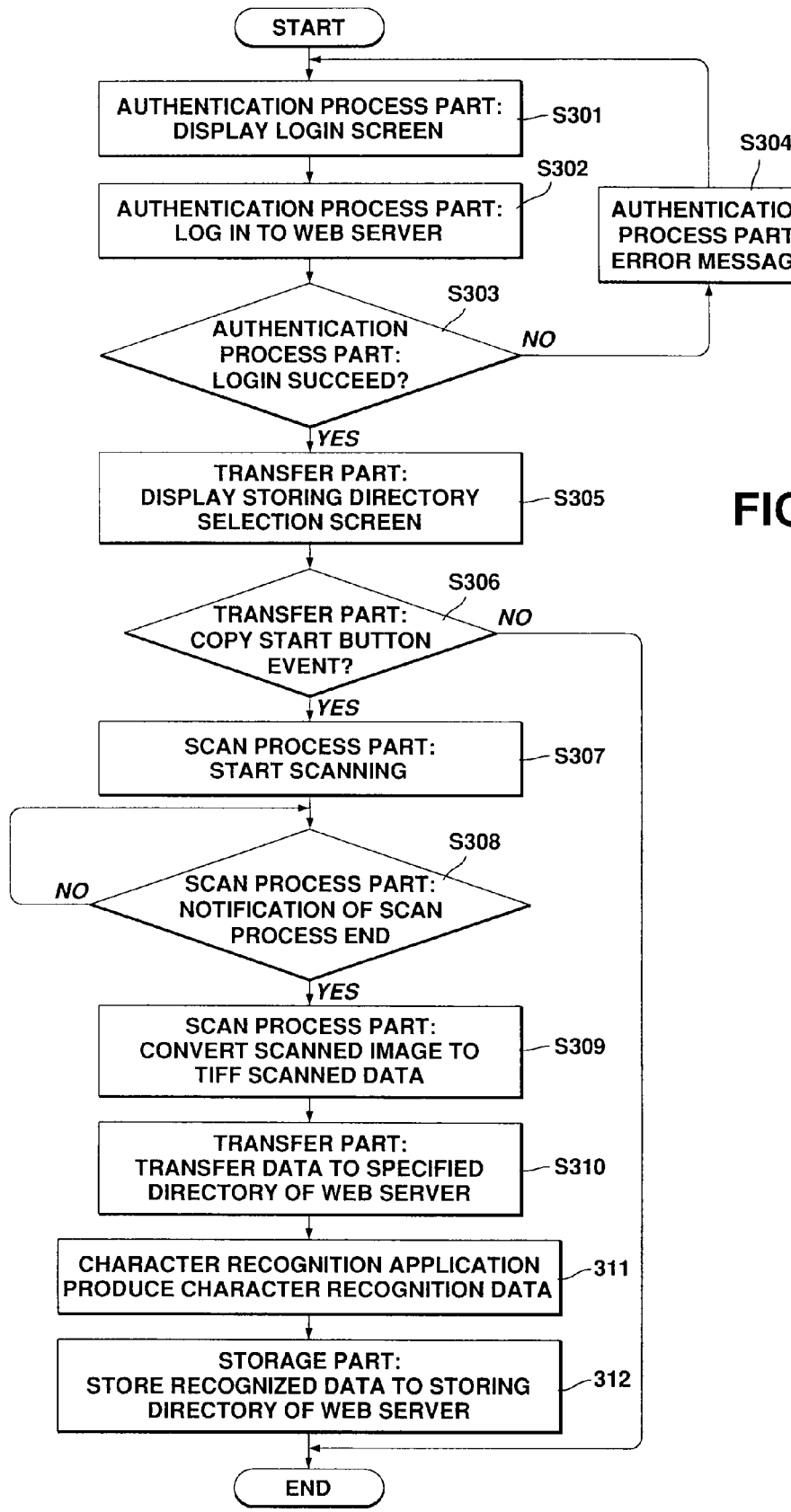
FIG. 4 is a flowchart showing a procedure for scanning a document and transferring scanned data to the Web server by the SCAN to WEB application.

Next, the scanned data processing method in the compound machine 100 will be described. FIG. 4 is a flowchart showing a procedure for scanning a document and transferring scanned data to the Web server 300 by the SCAN to WEB application 117.

Figure 5A:
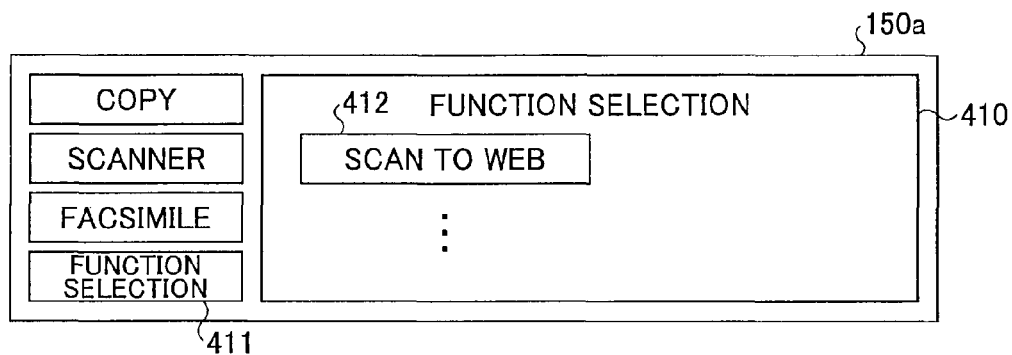
FIG. 5A is an example of the function selection screen displayed on the operation panel.

To begin scanning process by the SCAN to WEb application, the user touches a function selection button in an initial screen displayed on the operation display part of the operation panel 150. The function selection screen is displayed on the operation display part 150a by the SCS 122. FIG. 5A is an example of the function selection screen 410 displayed on the operation display part 150a of the operation panel 150.

In the function selection screen 410 shown in FIG. 5A, when the user touches a "SCAN to WEB" button 412, the OCS 126 receives a key event corresponding to the button, and the SCS 122 notifies the SCAN to WEB application 117 of the event, so that the SCAN to WEB application 117 starts scan data processing.

Figure 5B:
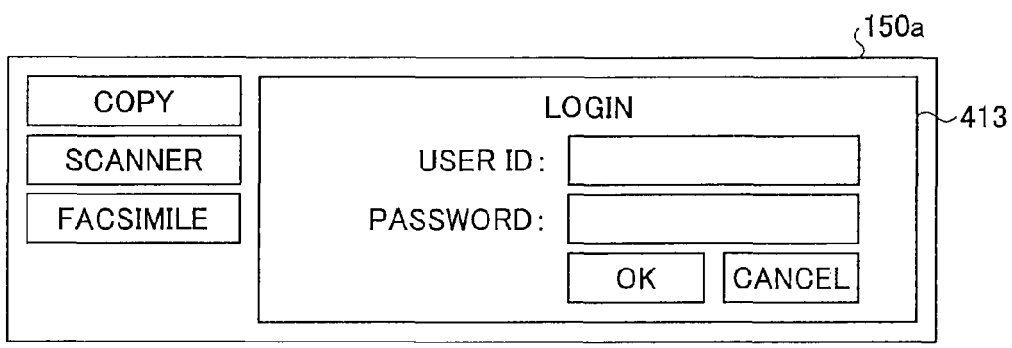
FIG. 5B is an example of login screen.

In the SCAN to WEB application 117, the authentication processing part 161 displays a login screen 413 on the operation display part 150a for the user to log on to the Web server 300 as shown in FIG. 5B in step S301. The screen is displayed by calling drawing functions of the OCS function library 164. In the following description for displaying data on the operation display part 150a, function call for drawing function is performed.

In the login screen 413, when the user inputs the user ID and the password, the authentication processing part 161 receives each key code via the OCS 126 and the SCS 122. The authentication processing part 161 sends the received user ID and the password to the Web server 300, so that logon to the Web server is performed in step S302.

Next, the authentication processing part 161 receives login result from the Web server 300, and determines if the login succeeds or not in step S303. If login fails, an error message is displayed on the operation display part 150a in step S304.

Figure 5C:
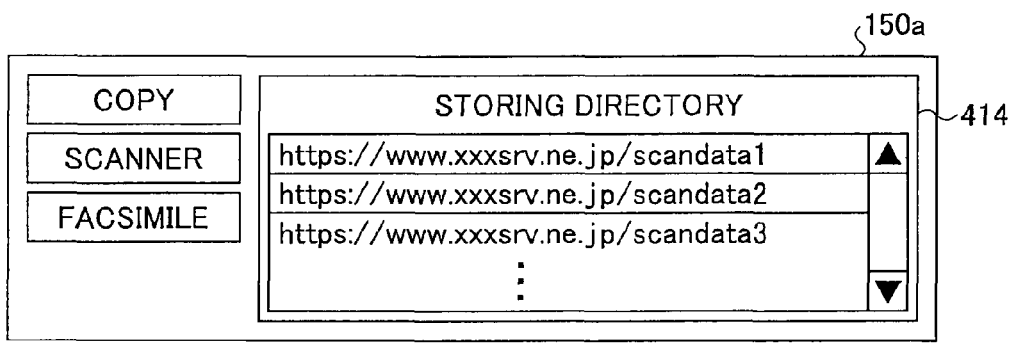
FIG. 5C is an example of a storing directory selection screen.

If login succeeds, a storing directory selection screen 414 is displayed on the operation display part 150a of the operation panel 150 by the transfer part 163 in the SCAN to WEB application 117 in step S305, then, the state enters in an event input waiting state. FIG. 4C is an example of the storing directory selection screen 414. As shown in FIG. 5C, a list of directories for storing scanned data is shown in which a directory can be selected from the list.

The user selects a directory on the Web server 300 from the list, and sets a document to be scanned on the ADF (Auto Document Feeder), and pushes a copy start button.

The transfer part 163 determines whether an event received from the OCS 126 via the SCS 122 is the copy start button in step S306. If the event is the copy start button, scanning process is started by the scanning process part 162.

The scanning process part 162 starts scanning the document that is set on the ADF by using the scanner engine 103 by calling a scan function registered in the image function library 165 in step S307. The scanning process part 162 enters in a waiting state waiting for receiving a scanning process end notification in step S308. At this time, job generation and job start necessary for scanning are performed by the ECS 124, and allocation and release of image memory area are performed by the MCS 125.

When the scanning process part 162 receives the scanning process end notification, the scanning process part 162 reads scanned image (bit map data) stored in an image memory, and converts the scanned image into a scanned data file that is TIFF format in step S309. At this time, the file name is automatically generated. The compound machine 100 can be configured such that the file name of the scanned data can be specified by the user.

The transfer part 163 transfers the scanned data file to the Web server 300 by specifying the directory that is selected from the storing directory selection screen 414 in step S310. More specifically, the transferring process is performed by the httpd 142 and the network controller 104 that are launched by the inetd 141 in response to an instruction by the transfer part 163.

The Web server 300 receives the scanned data file from the compound machine 100, and stores the received scanned data file in the designated storing directory 302 in the HDD 301. At this time, if a character recognition application is installed in the Web server 300, the character recognition application recognizes characters in the scanned data file in step S311 and the result file is stored in the HDD 301.

As a result, the scanned data file obtained by scanning a document is stored in the shared storing directory 302 in the Web server 300 in step S312.

Since the storing directory 302 is a shared directory, the stored scanned data file can be displayed on the PC 200 by using the Web browser 201. That is, logon to the Web server 300 is performed by using the Web browser 201 on the PC 200, so that the PC 200 accesses the storing directory 302, and the Web browser 201 displays the scanned data file stored in the storing directory 302. For printing the scanned data file, when the Web browser 201 displays the scanned data file, the scanned data file can be printed by using a desired printer by using printing capability provided by the Web browser 201.

As mentioned above, according to the compound machine 100 of the first embodiment, the scanning process part 162 in the SCAN to WEB application 117 causes the scanner engine 103 to scan a document to generate the scanned data. Then, the transfer part 163 sends the scanned data to the Web server 300 on the Internet 170. Therefore, the Web server 300 can collectively manage the scanned data. In addition, even when the compound machine 100 fails, the scanned data can be kept. Further, the scanned data can be used efficiently.

Second Embodiment

According to the compound machine 100 of the first embodiment, since the SCAN to WEB application 117 simply sends the scanned data to the storing directory in the Web server 300 that is set to be shared, it is necessary for the PC 200 to access the Web server 300 for printing the scanned data. On the other hand, according to the compound machine of the second embodiment, the compound machine 500 accesses the scanned data file stored in the storing directory in the Web server 300 so that the compound machine itself can print the file.

FIG. 6 shows main parts of the compound machine 500 and a network configuration including the compound machine 500 according to the second embodiment. As shown in FIG. 6, like the first embodiment, the compound machine of the second embodiment is connected to the Internet 170 to which the Web server 300 and the PC 200 are connected. TCP/IP is used for the compound machine 500, the Web server 300 and the PC 200.

For realizing the scanned data processing method of this embodiment, as shown in FIG. 6, the compound machine 500 mainly includes the SCAN to WEB application 517, the OCS function library 164, the image function library 165, control services such as the OCS 126, the SCS 122, the ECS 124 and the MCS 125, the inetd 141, the httpd 142, the scanner engine 103, a black and white laser printer (B&W LP) 101, a color laser printer (Color LP) 102, the network controller 104 and the operation panel 105.

The configuration of the SCAN to WEB application 517 is different from that of the first embodiment. That is, the SCAN to WEB application 517 of the second embodiment includes the authentication part 161, a scanning process part 162, a transfer part 163 and a printing process part 501. The SCAN to WEB application 517 is different from that of the first embodiment in that the SCAN to WEB application 517 includes the printing process part 501.

The printing process part 501 displays a scanned data file list screen on the operation display part 150a, in which the scanned data file list screen shows a list of scanned data files stored in the shared storing directory 302. In addition, the printing process part 501 calls functions on print processing in the image function library 165, and prints the scanned data file selected from the scanned data file list screen by the user. Other configurations of the SCAN to WEB application 517, the compound machine 500, PC 200 and the Web server 300 are the same as those of the first embodiment.

Scanning process and transfer process performed by the SCAN to WEB application 517 are the same as those of the SCAN to WEB application of the first embodiment.

Figure 7:
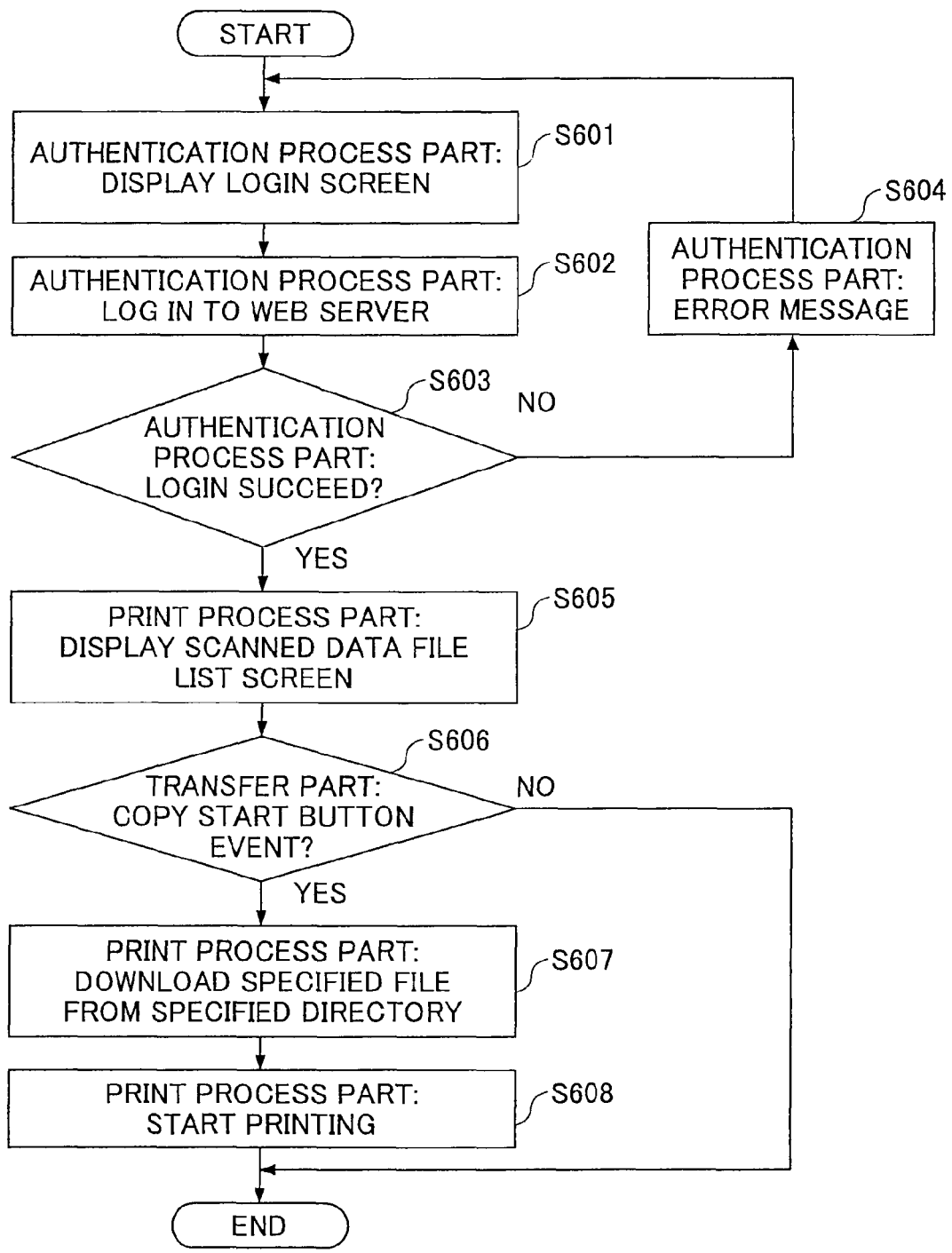
FIG. 7 is a flowchart showing the procedure of the printing process by the SCAN to WEB application.

In the following, printing process for the scanned data file by the compound machine 500 will be described. FIG. 7 is a flowchart showing the procedure of the printing process by the SCAN to WEB application 517.

Before the printing process is started, first, the user touches a function selection button from the initial screen displayed on the operation display part 150a.

Figure 8A:
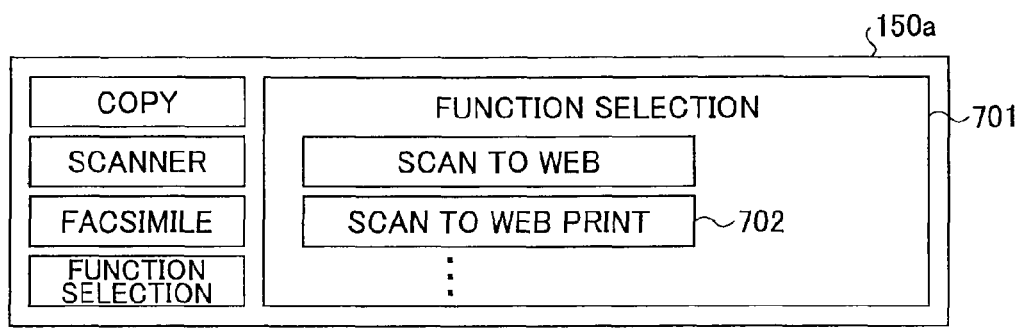
FIG. 8A shows an example of a function selection screen according to the second embodiment.

Then, the function selection screen is displayed on the operation display part by the SCS 122. FIG. 8A shows an example of the function selection screen 701 on the operation display part 150a.

When the user touches a "SCAN to WEB print" button on the function selection screen 701, the OCS 126 receives a key event corresponding to the button, and the event is sent to the SCAN to WEB application by the SCS 122, so that scanned data printing process starts by the SCAN to WEB application 517.

In the SCAN to WEB application 517, the authentication process part 161 displays the login screen 413 shown in FIG. 5B on the operation display part 150a in step S601. In the login screen 413, when the user inputs the user ID and the password, the authentication process part 161 receives each key code via the OCS 126 and the SCS 122. The authentication process part 161 sends the received user ID and the password to the Web server 300, so that the user logs on to the Web server in step S602.

Next, the authentication process part 161 receives the login result from the Web server, and determines whether login succeeds or fails in step S603. When the login fails, an error message is displayed on the operation display part 150a in step S604.

Figure 8B:
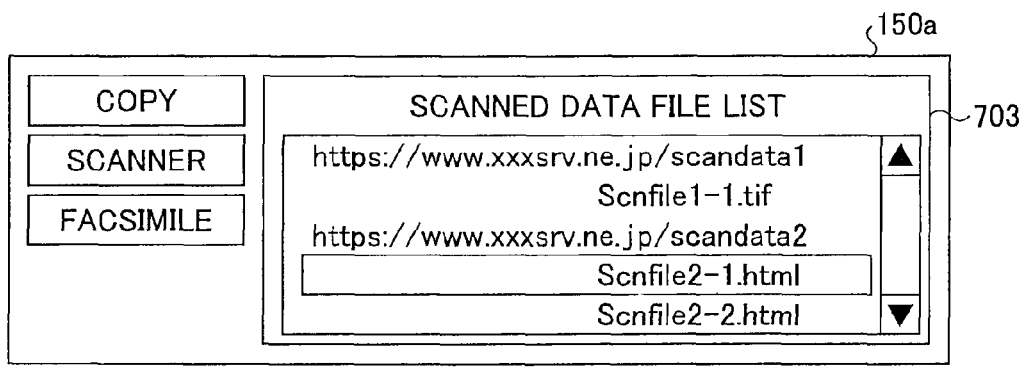
FIG. 8B shows an example of a scanned data file list screen according to the second embodiment.

When the login succeeds, the printing process part 501 displays the scanned data file list screen 703 on the operation display part 150a in step S605, and enters event waiting state. FIG. 8B shows an example of the scanned data file list screen 703. As shown in FIG. 8B, the scanned data file list screen 703 shows a list of the scanned data files stored in the storing directory 302 in the Web server 300, in which a scanned data file can be selected from the list.

The user selects a desired scanned data file from the scanned data file list screen 703 and pushes a copy start button.

The printing process part 501 determines whether the event received from the OCS 126 via the SCS 122 is the copy start button in step S606. When the event is the copy start button, the printing process part 501 downloads the selected scanned data file from the Web server 300 in step S607.

Then, by calling the printing function registered in the image function library 165, the printing process part 501 starts to print the downloaded scanned data file by using the black and white laser printer or the color laser printer 102 in step S608. At this time, by the printing function, job generation and job start necessary for scanning process are performed by the ECS 124, and allocation and release of image memory area is performed by the MCS 125.

According to the compound machine 500 of the second embodiment, the printing process part 501 receives the scanned data stored in the Web server 300, and prints the scanned data. Thus, the scanned data stored in the Web server 300 can be referred to by the compound machine and can be printed by the compound machine without using the PC 200. Thus, efficiency for using the scanned data improves.

Third Embodiment

According to the compound machine of the first and second embodiments, the SCAN to WEB application transfers the scanned data file to the Web server and the Web server performs character recognition process as necessary. On the other hand, the compound machine 800 of the third embodiment performs character recognition process on the scanned data, and the recognized data file obtained from the character recognition process is transferred to the Web server 300.

Figure 10:
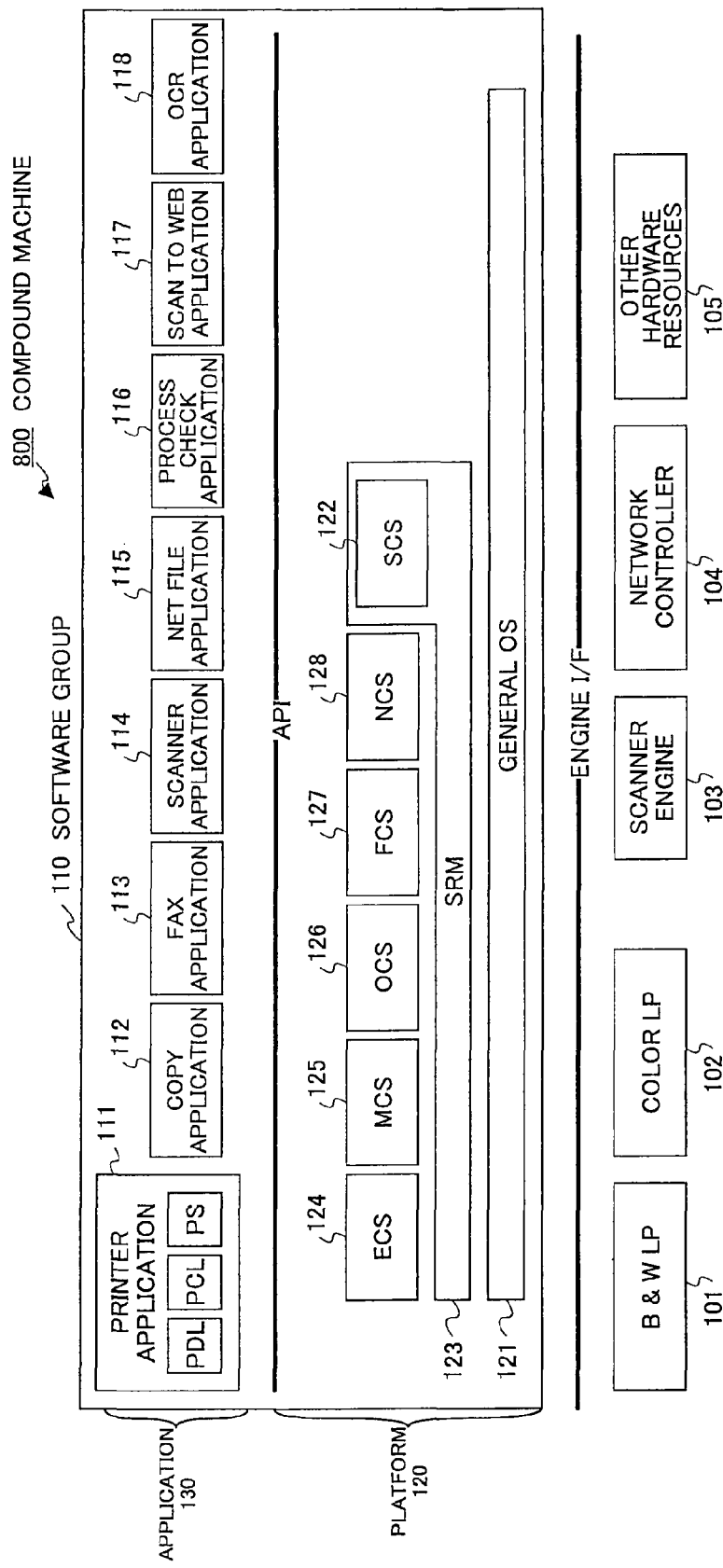
FIG. 10 is a block diagram of the compound machine according to the third embodiment.

FIG. 9 shows main parts of the compound machine and a network configuration including the compound machine according to the third embodiment. FIG. 10 is a block diagram of the compound machine 800.

As shown in FIGS. 9 and 10, the compound machine 800 is different from the compound machine 100 of the first embodiment in that the compound machine 800 includes the OCR application 118. Other configuration is the same as that of the compound machine 100 of the first embodiment.

The OCR application 118 performs character recognition process on the scanned data generated by the SCAN to WEB application 117 to generate a recognized data file. The generated recognized data file is transferred to the Web server 300 by the transfer part 163 of the SCAN to WEB application 117.

Figure 11:
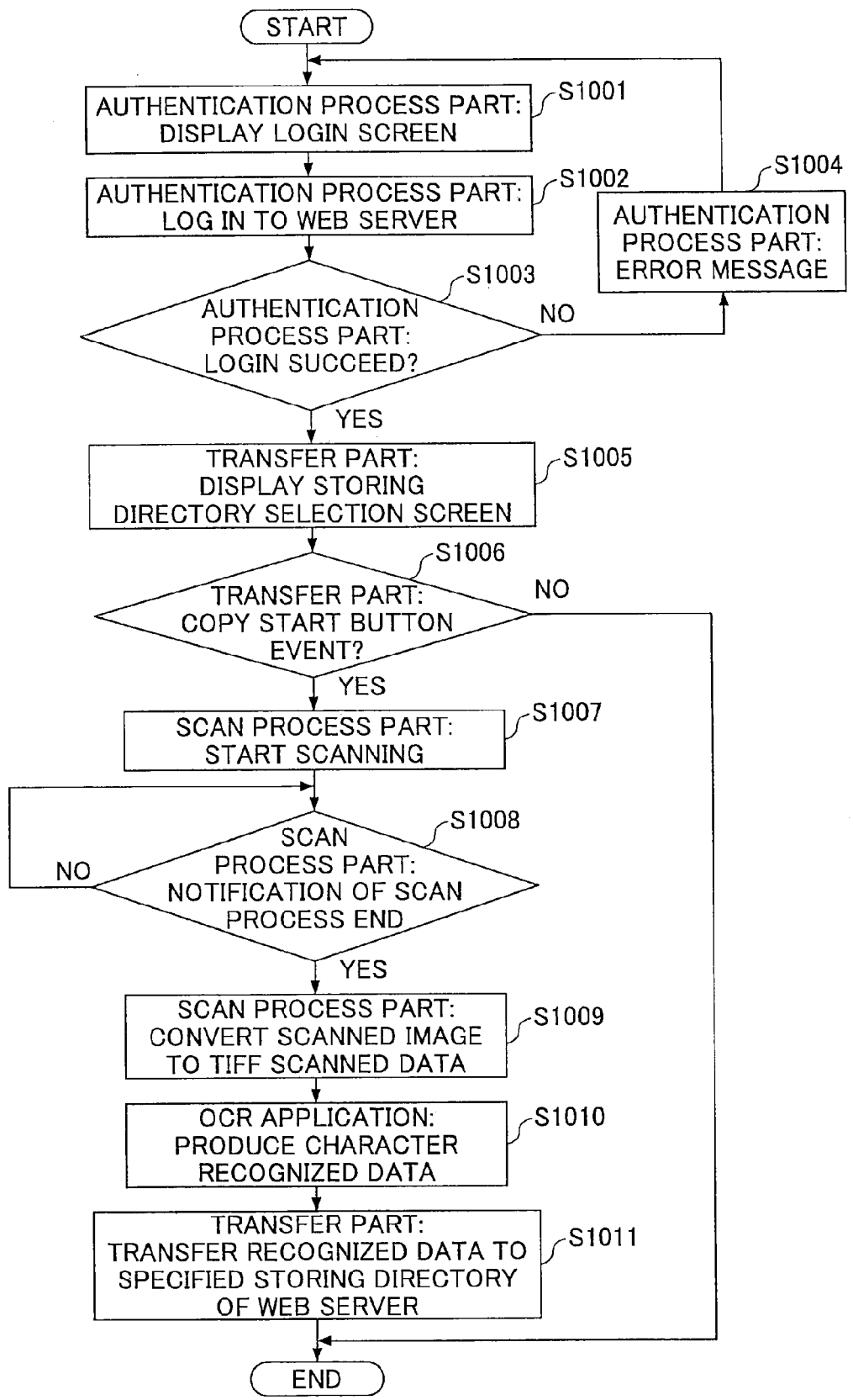
FIG. 11 is a flowchart showing the procedure of scanning process, character recognition process and process for transferring recognized data file to the Web server according to the third embodiment.

FIG. 11 is a flowchart showing the procedure of scanning process, character recognition process and process for transferring recognized data file to the Web server 300.

The procedure from displaying login screen to conversion of scanned data (steps S1001-1009) is the same as the corresponding procedure of the first embodiment (FIG. 4, steps S301-S309).

When the scanned data is generated, the OCR application 118 receives the generated scanned data and performs character recognition process on the data to generate the recognized data file in step S1010. Then, the transfer part 163 in the SCAN to WEB application 117 transfers the produced recognized data file to the Web server 300. This transfer process is performed by the httpd 142 and the network controller 104 launched by the inetd 141 according to the instruction of the transfer part 163 in the same way as the compound machine 100 of the first embodiment.

Therefore, it is not necessary to perform character recognition process in the Web server 300, and the Web server directly stores the recognized data file in the storing directory 302. The compound machine 800 can send both of the scanned data and the recognized data to the Web server 300.

As mentioned above, according to the compound machine 800 of the third embodiment, the scanning process part 162 causes the scanner engine 103 to scan a document to generate scanned data. Then, the OCS application 118 performs the character recognition process on the scanned data. Then, the transfer part 163 of the SCAN to WEB application 117 sends the recognized data to the Web server 300 on the Internet 170. Therefore, the Web server 300 can collectively manage the recognized data so that the recognized data can be kept even when the compound machine 800 fails, in addition, the recognized data can be used efficiently.

Fourth Embodiment

According to the compound machine 800 of the third embodiment, the OCR application 118 performs character recognition process on the scanned data to generate the recognized data file, and the recognized data file is simply sent to the Web server 300 and the recognized data file is stored in the shared storing directory 302. Thus, for printing the recognized data file, it is necessary for the PC 200 to access the Web server 300 to print the recognized data file by using the Web browser 201 in the PC 200. On the other hand, according to a compound machine 1100 of the fourth embodiment, the compound machine 1100 further accesses the Web server 300 to print the recognized data file stored in the storing directory in the Web server 300.

Figure 12:
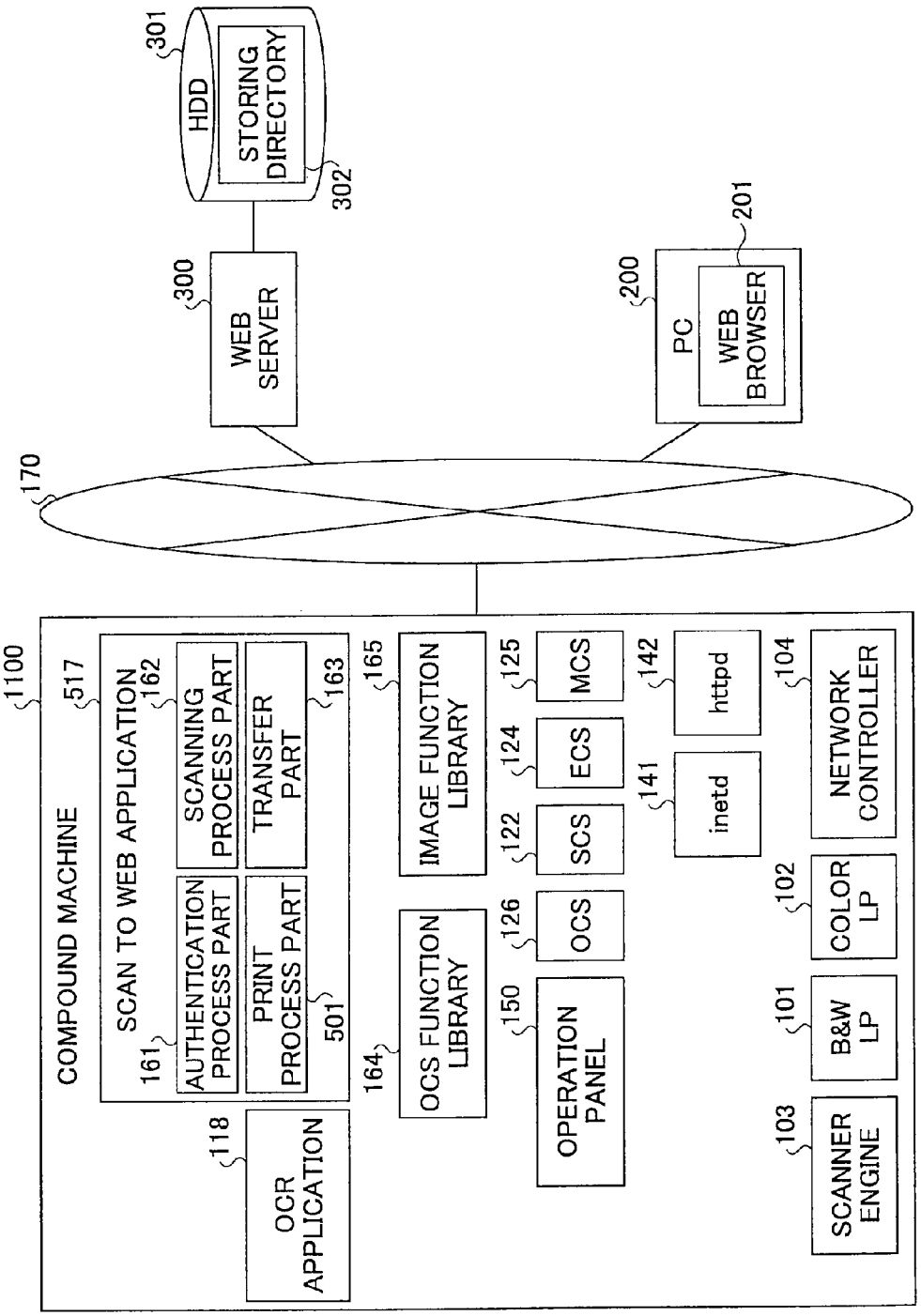
FIG. 12 shows a main configuration of the compound machine of the fourth embodiment.

FIG. 12 shows a main configuration of the compound machine 1100 of the fourth embodiment. As shown in FIG. 12, the compound machine 1100 is different from the compound machine 800 of the third embodiment in that the compound machine 1100 includes the printing process part 501 in the SCAN to WEB application 117. Other parts are the same as those of the compound machine 800.

The printing process part in the SCAN to WEB application 117 prints a recognized data file selected by the user among from recognized data files stored in the storing directory that is shared. The printing process by the printing process part 501 is the same as that of the compound machine 500 of the second embodiment (FIG. 7).

Therefore, according to the compound machine 1100 of the fourth embodiment, the printing process part 501 receives the recognized data from the Web server, and prints the recognized data. Therefore, the recognized data can be printed without using the PC 200, so that efficiency for using the recognized data can be further improved.

Fifth Embodiment

According to the embodiments described so far, the SCAN to WEB application sends the scanned data to the WEB server 300. On the other hand, according to the compound machine 1200 of the fifth embodiment, the scanned data can be also sent to transfer destinations other than the WEB server.

The compound machine 1200 includes a SCAN to Mail application and a SCAN to File application in addition to the SCAN to WEB application. The configuration of the other parts is the same as that shown in FIGS. 2 and 3. The SCAN to Mail application is an application for sending scanned data to a designated mail address. The SCAN to File application is an application for storing a scanned data in a designated location. The SCAN to File application can use FTP, NFS, NetBIOS and the like. To use NetBIOS means, for example, to use the mechanism of the shared file of Windows network.

As to the SCAN to WEB application, the storing directory can be specified by the form shown in FIG. 5C. As to the SCAN to Mail application and the SCAN to File application, the storing location can be specified by using addresses shown in FIG. 13. In addition, the compound machine 1200 is configured such that a plurality of transfer destinations can be selected.

Each configuration of the SCAN to Mail application and the SCAN to File application is similar to that of the SCAN to WEB application 117. That is, each of the SCAN to Mail application and the SCAN to File application includes the scanning process part and the transfer part. The transfer part of the SCAN to Mail application has a capability to send the scanned data to a designated address as an e-mail. The transfer part of the SCAN to File application has a capability to store the scanned data in a designated storing location. In addition, each application of the fifth embodiment can convert scanned data into a plurality of types of data. One of the plurality of types of data is OCR data that is obtained by performing character recognizing process on the scanned data.

The compound machine 1200 further includes a control program for selecting an application by which necessary process is performed among from the SCAN to File, SCAN to WEN and SCAN to Mail applications. The control program displays screens on the operation panel, and necessary process is performed by an application according to an operation on the screen by the user. The control program may include the authentication process part similar to the authentication process part in the SCAN to WEB application 117.

FIGS. 14-17 show transition of screens displayed on the operation display part of the operation panel of the compound machine 1200 of the fifth embodiment.

FIG. 14 shows a screen in which it is determined to send OCR data to a specified directory in a WEB server. In this state, if a document is set and a copy button is pushed, the scanned data that is converted into OCR data is sent to the specified location.

Figure 15:
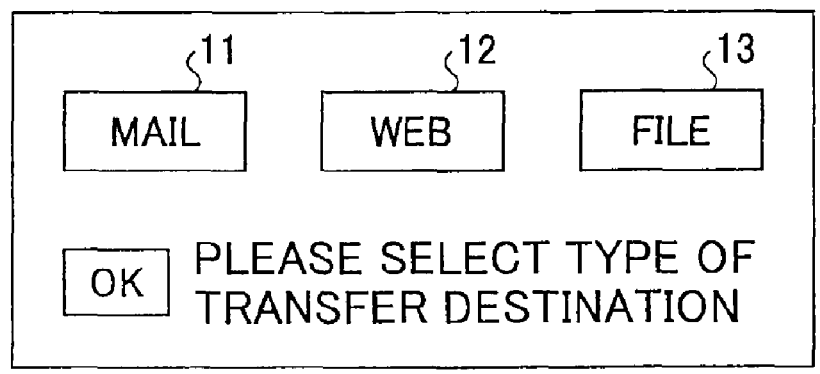
FIG. 15 is a screen for selecting destination types according to the fifth embodiment.

When the transfer destination add button is pushed in the screen of FIG. 14, a screen shown in FIG. 15 is displayed. In the screen, the user selects one of Mail, WEB and File buttons. By pushing Mail button, the scanned data is to be sent to a destination by e-mail. By pushing WEB button, the scanned data is to be sent to a WEB server. By pushing a File button, the scanned data is to be stored in a shared file on the network.

Figure 16:
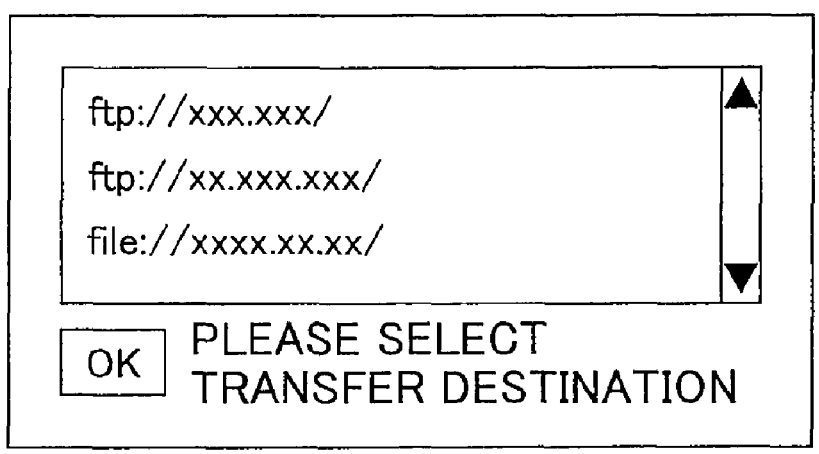
FIG. 16 is a screen for selecting destinations according to the fifth embodiment.

In FIG. 15, for example, when the File button 13 is selected, a screen shown in FIG. 16 is displayed. When the Mail button 11 is selected, a list of mail addresses is displayed. When the WEB button 12 is selected, the screen shown in FIG. 5C is displayed. Data such as the mail addresses can be obtained from UCS (user control service) that manages information on users. For example, by using the UCS, only destination addresses for a specific user of the compound machine 1200 can be listed.

In the screen of FIG. 16, when a transfer destination that requires an ID and a password to access is selected, a screen for inputting an ID and a password is displayed. In this case, the ID and the password input from the screen are used to access the transfer destination.

Figure 17:
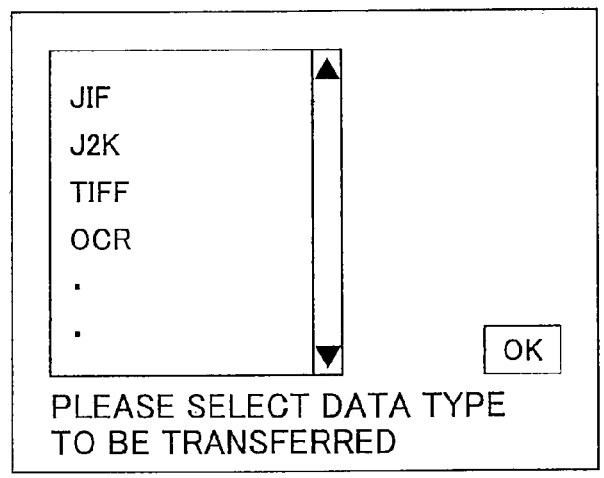
FIG. 17 is a screen for selecting data types according to the fifth embodiment.

After the transfer destination is selected, a screen shown in FIG. 17 is displayed. From the screen, a data type of data to be transferred is selected. The scanned data is converted into data of the selected data type and is transferred. After the selection of FIG. 17 ends, the screen is returned to FIG. 14 in which a transfer destination is added. After that, by pushing copy button, a document is scanned and the scanned data is transferred by an application according to the transfer destination.

As mentioned above, access to the transfer destination can be restricted by using the ID and the password. In addition to that, when using e-mail for transferring data, the destination can be restricted according to users. For example, the compound machine 1200 can be set such that an e-mail can not be sent to predetermined domains for a specific user.

Figure 18:
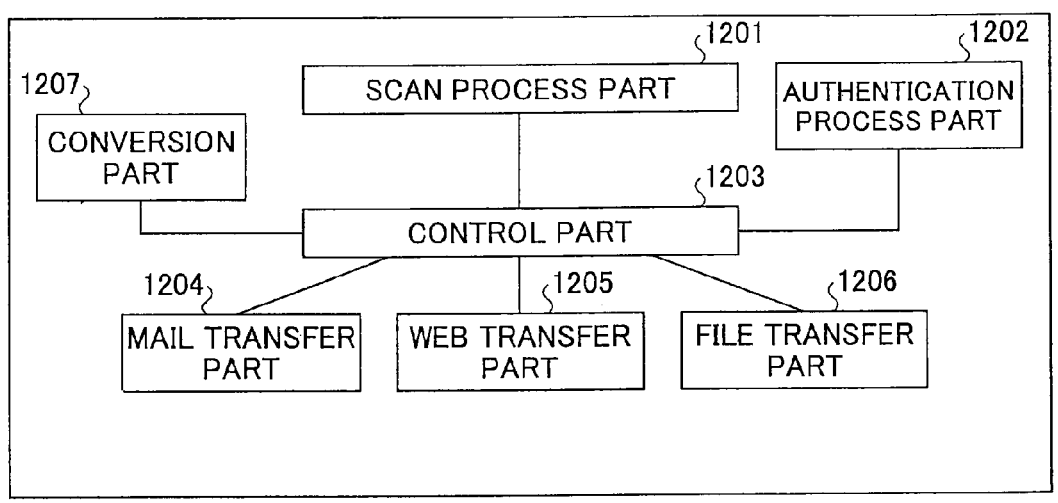
FIG. 18 is a block diagram showing a configuration of an application according to the fifth embodiment.

In the above-mentioned example, programs of SCAN to Mail application, SCAN to File application, SCAN to WEB application and the control program are separated. Thus, if there are a plurality of transfer destinations, the scanning process is performed by an application that operates first. Transferring process after the scanning process is performed by each application. In stead of providing the SCAN to Mail application, SCAN to File application, SCAN to WEB application and the control program separately, these can be configured as one application. In this case, a configuration example of the application is shown in FIG. 18. As shown in FIG. 18, the application includes a scanning process part 1201, an authentication process part 1202, a control part 1203 (including display capability), a Mail transfer part 1204, a WEB transfer part 1205, a File transfer part 1206 and a conversion part 1207. In the application, under the control by the control part 1203, each part performs each process. For example, when a Mail address and OCR data are selected by the user, the control part 1203 stores the selected Mail address in a memory. Then, when the copy button is pushed and a document is scanned, the control part 1203 causes the conversion part 1207 to perform OCR conversion, and causes the Mail transfer part 1204 to send the converted data to the stored Mail address.

According to the fifth embodiment, since the transfer destination can be selected, the scanned data can be used further efficiently.

Each application described in each embodiment can be installed in the compound machine from a recording medium such as a SD card. In addition, the application can be installed in the compound machine via a network.

The present invention is not limited to the specifically disclosed embodiments, and variations and modifications may be made without departing from the scope of the present invention.

What is claimed is:

1. An image processing apparatus comprising:
   a display configured to display a first selection screen area for selecting a transfer destination of image data from among a plurality of transfer destinations, and a second selection screen area for selecting an image process performed on the image data;
   a scanner configured to scan a document to produce the image data;
   a network interface configured to transfer the image data to the selected transfer destination, wherein the selected transfer destination is a server on a network that processes the image data in accordance with the selected image process to generate processed image data;
   the network interface configured to retrieve the processed image data from the server; and
   a printer unit configured to print the retrieved processed image data.

2. The image processing apparatus according to claim 1, wherein the selected image process is a translation process that includes performing character recognition of the image data.

3. An image processing apparatus comprising:
   a display configured to display a first selection screen area for selecting a transfer destination of image data from among a plurality of transfer destinations;
   a scanner configured to scan a document to produce the image data;
   a network interface configured to transfer the image data to the selected transfer destination, wherein the selected transfer destination is a server on a network that recognizes the image data and performs a process on the image data based on the recognition of the image data to generate processed image data;
   the network interface configured to retrieve the processed image data from the server; and
   a printer unit configured to print the retrieved processed image data.

4. The image processing apparatus according to claim 3, wherein the process performed on the image data based on the recognition of the image data includes performing optical character recognition of the image data.

5. A method of processing image data at an image processing apparatus, the method comprising:
   displaying, by a display of the image processing apparatus, a first selection screen area for selecting a transfer destination of the image data from among a plurality of transfer destinations, and a second selection screen area for selecting an image process performed on the image data;
   scanning, by a scanner of the image processing apparatus, a document to produce the image data;
   transferring, by a network interface of the image processing apparatus, the image data to the selected transfer destination, wherein the selected transfer destination is a server on a network that processes the image data in accordance with the selected image process to generate processed image data;
   retrieving, by the network interface of the image processing apparatus, the processed image data from the server; and
   printing, by a printer unit of the image processing apparatus, the retrieved processed image data.

6. The method according to claim 5, wherein the selected image process includes performing character recognition of the image data.

7. A method of processing image data at an image processing apparatus, the method comprising:
   displaying, by a display of the image processing apparatus, a first selection screen area for selecting a transfer destination of the image data from among a plurality of transfer destinations;

scanning, by a scanner of the image processing apparatus, a document to produce the image data;

transferring, by a network interface of the image processing apparatus, the image data to the selected transfer destination, wherein the selected transfer destination is a server on a network that recognizes the image data and performs a process on the image data based on the recognition of the image data to generate processed image data;

retrieving, by the network interface of the image processing apparatus, the processed image data from the server; and printing, by a printer unit of the image processing apparatus, the retrieved processed image data.

8. The method according to claim 7, wherein the process performed on the image data based on the recognition of the image data includes performing character recognition of the image data.

9. A non-transitory computer-readable medium including computer program instructions, which when executed by an image processing apparatus, cause the image processing apparatus to perform a method of processing image data, the method comprising:

displaying a first selection screen area for selecting a transfer destination of the image data from among a plurality of transfer destinations, and a second selection screen area for selecting an image process performed on the image data;

scanning a document to produce the image data;

transferring the image data to the selected transfer destination, wherein the selected transfer destination is a server on a network that processes the image data in accordance with the selected image process to generate processed image data;

retrieving the processed image data from the server; and printing the retrieved processed image data.

10. The non-transitory computer-readable medium according to claim 9, wherein the selected image process includes performing character recognition of the image data.

11. A non-transitory computer-readable medium including computer program instructions, which when executed by an image processing apparatus, cause the image processing apparatus to perform a method of processing image data, the method comprising:

displaying a first selection screen area for selecting a transfer destination of the image data from among a plurality of transfer destinations;

scanning a document to produce the image data;

transferring the image data to the selected transfer destination, wherein the selected transfer destination is a server on a network that recognizes the image data and performs a process on the image data based on the recognition of the image data to generate processed image data;

retrieving the processed image data from the server; and printing the retrieved processed image data.

12. The non-transitory computer-readable medium according to claim 11, wherein the process performed on the image data based on the recognition of the image data includes performing character recognition of the image data.

\* \* \* \* \*